United States Patent Office 3,288,772
Patented Nov. 29, 1966

3,288,772
POLYMERIZATION METHOD USING NOVEL
SURFACE-ACTIVE AGENTS
Ewald Georg Becker, Hamburg-Bahrenfeld, and Theophil
Wieske, Hamburg-Grossflottbek, Germany, assignors to
Lever Brothers Company, New York, N.Y., a corporation of Maine
No Drawing. Filed July 14, 1961, Ser. No. 123,991
17 Claims. (Cl. 260—89.5)

This invention relates to improved surface-active agents and their use. These surface-active agents are compounds, especially esters, containing only carbon, hydrogen and oxygen, which simultaneously satisfy certain conditions specified hereafter:

(1) They contain from one to three, preferably one, free carboxylic acid groups, or one to two, preferably one, anhydride groups derived from two carboxylic acid groups and in addition zero to one free carboxylic acid groups, per molecule.

(2) They contain at least one carboxylic acid radical derived from a polycarboxylic acid or a hydroxy-carboxylic acid, per molecule.

(3) They may contain up to three free hydrophilic groups other than carboxylic acid or anhydride groups, such as for example hydroxy groups, per molecule, the number of such groups being at most equal to and preferably less than, the sum of the number of free carboxylic acid groups and the number of anhydride groups.

In most cases it is preferred to have no free hydroxy groups present.

(4) They contain at least two lipophilic groups, such as saturated or olefinically unsaturated aliphatic or cycloaliphatic hydrocarbon radicals or heterocyclic radicals containing only carbon and oxygen in the ring structure, containing from 5 to 30, and preferably from 11 to 18 carbon atoms, per molecule. The number of carbon atoms in each lipophilic group is preferably at least 16 when only two lipophilic groups are present and may be less when more than two lipophilic groups are present.

(5) The ratio between the total number of carbon atoms and the sum of the number of free carboxylic acid groups and the number of anhydride groups per molecule is at least 40:1 and preferably lies between 45:1 and 80:1. In case the molecule contains also free hydrophilic groups other than carboxylic acid or anhydride groups, the ratio between the total number of carbon atoms and the sum of the number of free carboxylic acid groups and the number of anhydride groups is at least 55:1 and preferably lies between 60:1 and 100:1.

(6) The molecule weight does not exceed 2000 and preferably lies between 600 and 1600.

The substances may be described by the general formula:

$$R_m(\text{---CO.O---})_n(\text{---CO.O.CO---})_r(\text{---CO.OH})_x(\text{---OH})_y$$

wherein

R represents a radical selected from the class consisting of saturated and olefinically unsaturated aliphatic hydrocarbon radicals containing 1 to 30 carbon atoms, cycloaliphatic hydrocarbon radicals containing 5 to 30 carbon atoms, and heterocyclic radicals containing only carbon and oxygen in the ring and containing in all 4 to 30 carbon atoms, $m=2$ to 12
$n=1$ to 12
$r=0$ to 2
$x=0$ to 1 when $r=1$ to 2 and
$x=1$ to 3 when $r=0$
$y=0$ to 3, and does not exceed $x+r$, the ratio of the total number of carbon atoms to $x+r$ is at least 40:1 when $y$ is zero, and is at least 55:1 when $y$ is 1 to 3; and the molecular weight is up to about 2000.

Of particular value are substances which satisfy both the general formula given above and the formula:

$$R_m(\text{---CO.O---})_m(\text{---CO.OH})_x$$

wherein

R, m, $R_m$ have the respective meanings defined above
$n=1$-12 and
$x=1$ to 3

The surface-active agents of the invention may be prepared from aliphatic or cycloaliphatic mono- and polycarboxylic acids and aliphatic or cycloaliphatic mono- or polyvalent alcohols by reacting them in suitable quantities and in suitable order under suitable circumstances so as to obtain products satisfying the conditions enumerated above.

The aliphatic or cycloaliphatic carboxylic acid radicals present in such substances may be derived from monocarboxylic acids containing 2 to 24 carbon atoms such as, for example, acetic acid, propionic acid, butyric acid, valeric acid, caproic acid, heptanoic acid, caprylic acid, pelargonic acid, caprinic acid, lauric acid, myristic acid, palmitic acid, stearic acid, arachidic acid, eicosanoic acid, behenic acid, lignoceric acid, cerotic acid, melissic acid, palmitoleic acid, oleic acid, linoleic acid, linolenic acid, erucic acid, hydroxycarboxylic acids, such as, for example, glycolic acid, lactic acid, malic acid, tataric acid, citric acid, glyceric acid, tartronic acid, mucic acids, sugar acids, ricinoleic acid, mono- and dihydroxysteric acid, epoxidised unsaturated fatty acids or the acids derived from sugars and ether acids such as, for example, digylcolic acid.

They may also be derived from dicarboxylic acids, containing 2 to 36 carbon atoms such as, for example, oxalic acid, malonic acid, succinic acid, glutaric acid, adipic acid, pimelic acid, suberic acid, azelaic acid, sebacic acid, maleic acid, citraconic acid, mesaconic acid, itaconic acid, fumaric acid, dimeric fatty acids and tricarboxylic acids, such as, for example, aconitic acid or trimeric fatty acids.

They may also be derived from polycarboxylic acids obtained by reacting aliphatic mono- or polycarboxylic acids which contain a pair of conjugated olefinic double bonds with dienophile substances which are unsaturated mono- or dicarboxylic acids containing at least one olefinic double bond or a triple bond. The carboxylic acids containing a pair of conjugated olefinic double bonds may be derived from unsaturated fatty acids such as linoleic acid and linolenic acid by isomerization, or from ricinoleic acid by dehydration or they may be naturally occurring fatty acids such as, for example, eleostearic acid or licanic acid. The dienophile substances may be, for example, monocarboxylic acids such as sorbic acid, acrylic acid, propiolic acid, hexenoic acid, crotonic acid and undecylenic acid or dicarboxylic acids such as maleic acid, monomethylmaleic acid and dimethylmaleic acid.

The compounds are thought to be Diels-Alder adducts containing the grouping:

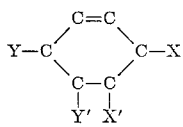

(I)

wherein

X and X' are different or identical radicals R'.CO.OH
Y and Y' are different or identical radicals R'.COOH or R''
R' is a divalent aliphatic hydrocarbon radical containing 0 to 23 carbon atoms and
R'' is a monovalent aliphatic hydrocarbon radical containing 1 to 24 carbon atoms.

Hydroxy groups may be introduced in such acids by epoxidation or carboxylic acid groups may be introduced by oxidation at a double bond, giving rise to substances containing the following groups:

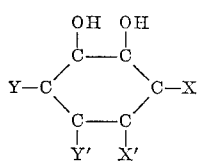

(II)

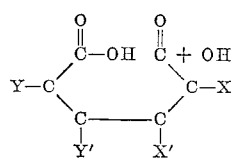

(III)

where X, X', Y and Y' have the same meaning as above.

The aliphatic or cycloaliphatic alcohol radicals present in the substances described above may be derived from monovalent alcohols containing 2 to 30 carbon atoms such as, for example, ethanol, propanol, isopropanol, butanol, pentanol, hexanol, heptanol, octanol, nonanol, decanol, undecanol, dodecanol, tetradecanol, hexadeconal, octadecanol, eicosanol, docosanol, hexacosanol, octadecenol, cyclohexanol, cyclohexenol, methylcyclohexanol, methylcyclohexenol.

They may also be derived from divalent alcohols containing 2 to 30 carbon atoms such as ethylene glycol, propylene glycol, butylene glycol, pentane diols, hexane diols, heptane diols, octane diols, nonane diols, decane diols, dodecane diols, tetradecane diols, hexadecane diols, octadecane diols, eicosane diols, from trivalent alcohols such as, for example, glycerol, from tetravalent alcohols such as, for example, pentaerythritol, and from other polyvalent alcohols such as, for example, the alcohols derived from mono- or di-saccharides or inositol.

Finally, they may be derived from condensation products of polyvalent alcohols such as, for example, diglycol, triglycol, tetraglycol, pentaglycol, hexaglycol, diglycerol, triglycerol, tetraglycerol, pentaglycerol, hexaglycerol, dipentaerythritol or they may contain additional aldehyde or keto groups, such as, for example, the mono- or di-saccharides.

The substances described above may be prepared by any suitable method, for example by dienophile addition, oxidation, esterification or condensation.

In effecting the reactions care should be taken to avoid undesired secondary reactions such as polymerisations. In consequence reaction temperatures should be kept as low as possible; they should not exceed 200° C. and preferably be between 50° and 140° C.

The formulae set out below by way of example are thought to represent the structures of various classes of substances that, in accordance with the invention, provide suitable surface-active agents.

Class 1

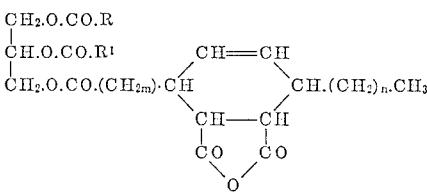

Class 2

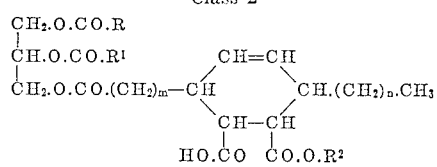

wherein:

R and $R^1$ are monovalent saturated or olefinically unsaturated hydrocarbon radicals containing from 5 to 30, preferably 11 to 18 carbon atoms, $R^2$ is a saturated or olefinically unsaturated hydrocarbon radical containing from 1 to 30, preferably 11 to 18 carbon atoms, and $m$ and $n$ are whole numbers, their sum being 0 to 18, preferably 6 to 12. The adduct group and the groups R and $R^1$ are interchangeable; the same applies to the groups CO.OH and $CO.O.R^2$. In the hydrocarbon chains $(CH_2)_m$ and $(CH_2)_n$, groups of the type —CH=CH— may be present.

These compounds can be obtained by reacting oils contaning fatty acid radicals (that is aliphatic monocarboxylic acid radicals) which contain a pair of conjugated olefinic double bonds, with dienophile substances which are unsaturated dicarboxylic acids such as mono- and dimethyl maleic acids, or derivatives of such acids such as anhydrides and esters thereof.

Class 3

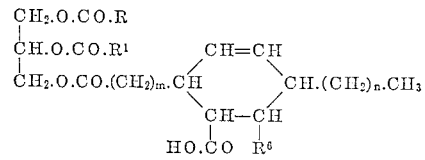

wherein:

R, $R^1$, $m$ and $n$ have the meaning described above,
$R^3$, $R^4$ and $R^5$ are a hydrogen atom or have the same meaning as $R^2$, and $R^6$ is a hydrogen atom or a monovalent saturated or olefinically unsaturated aliphatic hydrocarbon radical containing 1 to 3 carbon atoms.

These compounds can be obtained by reacting oils containing fatty acid radicals which contain a pair of conjugated olefinic double bonds, with dienophile substances, such as for example unsaturated monocarboxylic acids.

Class 4

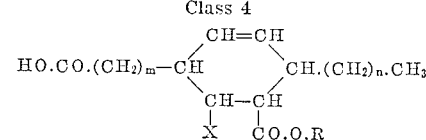

Class 5

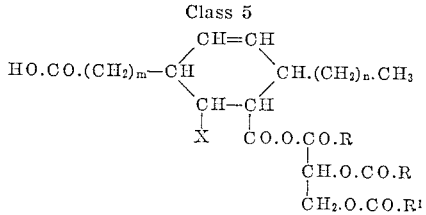

wherein:
R, $R^1$, $m$ and $n$ have the meaning described above and
X is an ester group, or a hydrocarbon radical.

These compounds can be obtaitned by reacting a fatty acid containing a pair of conjugated olefinic double bonds, with dienophile substances which are derivatives of unsaturated mono- or di-carboxylic acids.

Class 6

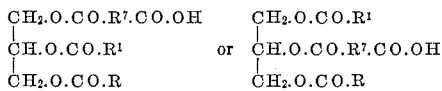

wherein:
R and $R^1$ have the meaning described above and
$R^7$ is a divalent saturated or olefinically unsaturated hydrocarbon radical containing 1 to 34 carbon atoms.

These compounds can be obtained by esterifying a diglyceride with a dibasic carboxylic acid or by destructive oxydation of an unsaturated triglyceride.

Class 7

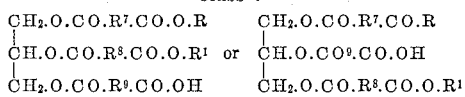

wherein R, $R^1$ and $R^7$ have the meaning described above and $R^8$ and $R^9$ have the same meaning as $R^7$. Such compounds can be obtained by reacting 1 mol. glycerol with 2 mol. halfester of a dicarboxylic ester and 1 mol. of a dicarboxylic acid or its anhydride.

Class 8

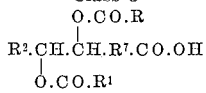

wherein R, $R^1$, $R^2$ and $R^7$ have the meaning described above.

These compounds can be obtained by esterifying 1 mol. of a dihydroxyfatty acid with 2 mol. of a fatty acid.

Class 9

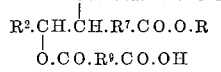

wherein R, $R^1$, $R^2$, $R^7$, $R^8$ and $R^9$ have the meaning described above, the radicals R, $R^1$ and the hydrogen atoms of the free carboxyl group being interchangeable. Such compounds can be obtained by esterification of 1 mol. of a dihydroxyfatty acid with 2 mol. of a dicarboxylic acid and 2 mol. of a monohydric alcohol.

Class 10

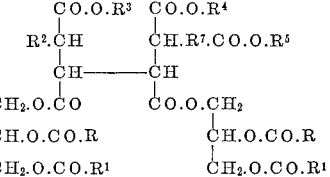

wherein R, $R^1$, $R^2$, $R^3$, $R^4$, $R^5$ and $R^7$ have the meaning described above, at least one of the radicals $R^3$, $R^4$ and $R^5$ being a hydrogen atom. The radicals $R^3$, $R^4$, $R^5$ and the diglyceride groups are interchangeable. These compounds can be obtained from an adduct of maleic acid and linoleic acid which adduct is oxidized to a pentabasic carboxylic acid of the formula

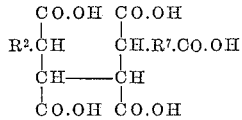

the latter being partially esterified with monovalent alcohols and/or diglycerides.

Class 11

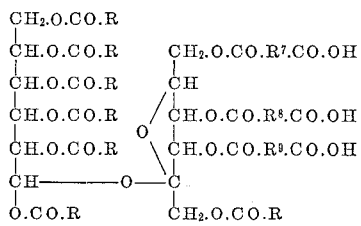

wherein R, $R^7$, $R^8$ and $R^9$ have the meaning described above. The radicals R may be different or identical. The radicals R, $R^7$.CO.OH, $R^8$.CO.OH and $R^9$.CO.OH are interchangeable. These compounds can be obtained by esterification of sugars, that is mono-or disaccharides, with monohydric alcohols and dibasic acids.

Class 12

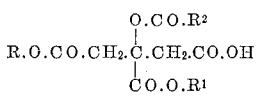

wherein R, $R^1$ and $R^2$ have the meaning described above. The radicals R and $R^1$ and the hydrogen atom of the free carboxylgroup are interchangeable. Such compounds can be obtained by esterification of 1 mol. of citric acid with 2 mol. of a monohydric alcohol and 1 mol. of a monobasic acid.

Class 13

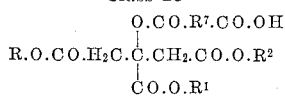

wherein R, $R^1$, $R^2$ and $R^7$ have the meaning described above. The radicals R, $R^1$ and $R^2$ and the hydrogen atom of the free carboxylgroup are interchangeable. These compounds can be obtained by esterifying 1 mol. of citric acid with 3 mol. of a monohydric alcohol and 1 mol. of a dibasic acid.

Class 14

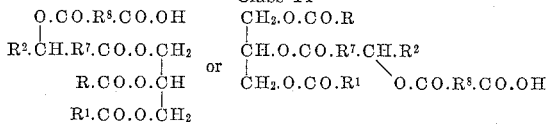

wherein R, $R^1$, $R^2$, $R^7$ and $R^8$ have the meaning described above. The radicals R, $R^1$ and $R^8$.CO.OH are interchangeable.

These compounds can be obtained by esterification of hydroxycarboxylic acids with glycerol, mono- and dicarboxylic acids or from triglycerides containing a hydroxycarboxylic acid radical and a dicarboxylic acid. The reaction products are not limited to the simple structure given above; thus products can be obtained containing two or more glyceride molecules coupled by a dibasic acid, such as, for example Class 15

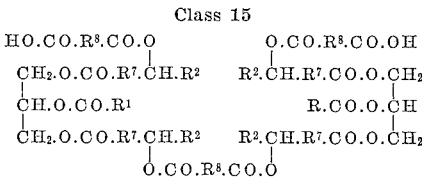

Class 16

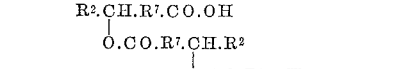

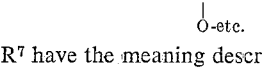

wherein $R^2$ and $R^7$ have the meaning described above, the free hydroxylgroup being esterified with a nonhydroxy acid when the ratio of the number of carbon atoms and the number of free carboxylgroups is not higher than 55:1.

Such compounds can be obtained by interesterification of hydroxycarboxylic acids.

Class 17

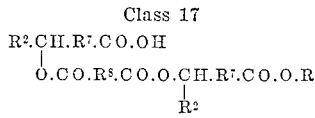

wherein R, R², R⁷ and R⁸ have the meaning described above.

These compounds can be obtained by esterifying 1 mol. of a hydroxycarboxylic acid with 2 mol. of a dicarboxyl-mono-carboxylic acid and 1 mol. of a monohydric alcohol or a diglyceride.

Class 18

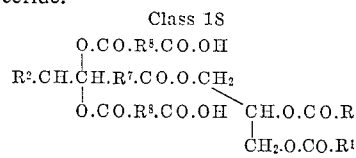

wherein R, R¹, R², R⁷ and R⁸ have the meaning described above.

These compounds can be obtained by esterifying 1 mol. of a dihydroxycarboxylic acid with 2 mol. of a dicarboxylic acid and 1 mol. of a monohydric alcohol or a diglyceride.

The surface-active agents according to the present invention may be used in the preparation of polymers. More specifically, they are of advantage in aqueous polymerization of water-insoluble unsaturated monomers as the polymers formed readily separate from the reaction mixture. In contradistinction thereto the emulsifiers known hitherto for emulsion-polymerisation, such as for example sodium laurate, all give rise to stable emulsions after polymerisation. This requires an additional coagulation step.

Suitable water-insoluble unsaturated monomers to be subjected to aqueous polymerization either as such or in combination are vinylchloride, methylmethacrylate, acrylonitrile, butadiene, vinylidene chloride, vinyl acetate and styrene.

Preferred water-insoluble unsaturated monomers are those belonging to the group consisting of vinylchloride, methylmethacrylate and their mixtures.

The following examples illustrate the invention:

Example I

The aqueous polymerizations were performed in Pyrex glass tubes (lengths 45 cm., diameter 2.7 cm.), which were sealed with a packing and a brass screw-clamp.

The tubes which had been given a perforated brass jacket (safety device against explosion), were next placed on a rotor turning around a horizontal shaft in a thermostat container filled with water. The centre line of the tube was at an angle of approximately 3° with the shaft of the rotor, so that consequently the contents of the tube were vigorously shaken.

The reaction conditions were kept constant, but in the formulation the quantities of initiator and surface-active agent were varied as shown in the table underneath. In this table is also shown the percentage of conversion after a reaction time of 20 hours.

For all tests were used 25 g. vinylchloride, 74 ml. water and $K_2S_2O_8$ as a catalyst at a temperature of 45° C. at a rotor speed of 45 revs./min.

One particular advantage of the surface-active agents II, III and IV, as shown in the table underneath, is that the polymer is separated from the reaction mixture whereas on using I (sodium laurate) after the polymerisation a stable emulsion is formed which has to be coagulated by pouring it into a 1% aqueous solution of sulphuric acid. Moreover, the mean molecular weights of the polymers obtained with II, III and IV (120,000, 115,000 and 122,000 respectively) are considerably higher than that of the polymer obtained with I (85,000).

TABLE

| | Emulsifier or Surface Active Agent in g. | Catalyst in mg. | Conversion, percent |
|---|---|---|---|
| I. Sodium laurate | 0.75 | 37.5 | 100 |
| II. Partial stearyl-ester of the condensation product of isomerised soybean oil and maleic acid anhydride | 0.10 | 75 | 100 |
| | 0.25 | 37.5 | 12 |
| | 0.25 | 75 | 84 |
| | 0.5 | 37.5 | 28 |
| | 0.5 | 75 | 86 |
| III. Castor oil completely esterified with maleic acid anhydride | 0.25 | 75 | 60 |
| | 0.25 | 112 | 86 |
| | 0.5 | 75 | 80 |
| IV. A reaction product of maleic anhydride with an interesterification product of groundnut oil and castor oil | 0.125 | 75 | 52 |
| | 0.25 | 75 | 24 |
| | 0.25 | 112 | 52 |
| | 0.25 | 150 | 88 |

Example II

A three-necked round-bottom flask, filled with a mechanical stirrer, thermometer reflux cooler and an inlet tube for nitrogen was fixed in a thermostat container filled with water, which was kept at a temperature of 80° C. A mixture consisting of 120 g. water, 40 g. methylmethacrylate, 0.20 g. $K_2S_2O_8$ and 36 g. of the surface-active agent II of Example I were kept in this apparatus under vigorous stirring for 2 hours. The conversion was 88%.

Modifications of the foregoing examples may also be employed in the present invention. For example, the adducts of isomerized soybean oil and sorbic acid, and the adducts of isomerized soybean oil and maleic acid may be used as the surface active agents in aqueous polymerizations. Many other modifications of the examples will, of course, be obvious to those skilled in the art. Accordingly, the present invention is not to be limited to the illustrative processes described in Examples 1 and 2.

What is claimed is:

1. In a process for the free-radical initiated polymerization of water-insoluble unsaturated monomers, wherein the polymerization is effected in an aqueous medium in the presence of an initiator and a surface active agent, the improvement which is to employ as the surface active agent in the foregoing process a compound having:

(a) from 2 to 12 organic radicals R selected from the group consisting of aliphatic saturated and olefinically unsaturated hydrocarbons containing from 1 to 30 carbon atoms, cycloaliphatic hydrocarbon radicals containing from 5 to 30 carbon atoms, and heterocyclic organic radicals consisting of carbon, oxygen and hydrogen atoms and having from 4 to 30 carbon atoms;

(b) from 1 to 12 divalent carboxylic acid groups of the formula —COO—;

(c) the only additional divalent functional radical in said compound being from 0 to 2 acid anhydride acid groups of the formula —COOCO—;

(d) from 0 to 3 carboxylic groups of the formula —COOH, there being at least one free carboxylic acid group when said compound is free of acid anhydride groups and there being not more than one free carboxylic acid group when said compound contains from 1 to 2 acid anhydride groups;

(e) the only additional functional group in said compound being from 0 to 3 hydroxy groups of the formula —OH, the number of said hydroxy groups not exceeding the total number of acid anhydride and free carboxylic acid groups;

said acid formed by combining said radicals R of class (a) with divalent carboxyl groups of class (b) to form a skeletal structure, and attaching all the remaining radicals of classes (c), (d) and (e) to the carbon atoms of said radicals of class (a);

there further being in said compound at least 2 lipophilic radicals R having from 5 to 30 carbon atoms, at least 40 carbon atoms for each free carboxylic acid group and each free anhydride group, and at least 55 carbon atoms for each free carboxylic acid group and acid anhydride group when said molecule contains a hydroxyl group; and said compound having a molecular weight not exceeding 2000.

2. A process according to claim 1, wherein the unsaturated monomer is vinylchloride and the initiator is a water-soluble peroxy compound.

3. A process according to claim 1, wherein the unsaturated monomer is methylmethacrylate and the initiator is a water-soluble peroxy compound.

4. A process according to claim 1, wherein the surface active agent is a compound having only hydrocarbon radicals of said class (a), carboxy groups of said class (b) and free carboxylic acid groups of said class (d).

5. Process according to claim 1, wherein the surface active agent is a triglyceride consisting of an adduct of isomerised soybean oil and a maleic acid half ester and the initiator is a water-soluble peroxy compound.

6. Process according to claim 1, wherein the surface active agent is a triglyceride consisting of an adduct of isomerised soybean oil and sorbic acid and the initiator is a water-soluble peroxy compound.

7. Process according to claim 1, wherein the surface active agent is a triglyceride consisting of an ester of castor oil and maleic acid and the initiator is a water-soluble peroxy compound.

8. Process according claim 1, wherein the surface active agent is a triglyceride derived from castor oil by interesterification with an oil until the resulting oil predominantly consists of molecules containing one hydroxy fatty acid radical, and esterification of the hydroxy group with maleic acid and the initiator is a water-soluble peroxy compound.

9. A process according to claim 1 wherein the monomer is selected from the group consisting of vinyl chloride and methyl methacrylate and the initiator is a water-soluble peroxy compound.

10. Process according to claim 1 wherein the surface-active agent is a triglyceride of glycerol and monocarboxylic acids containing about 5 to 30 carbon atoms, at least one of the acid radicals of said acids containing a cyclic group formed by addition of a dienophile substance selected from the class consisting of unsaturated monocarboxylic acids, unsaturated dicarboxylic acids and their anhydrides and esters, to conjugated double bonds in a fatty acid radical, and the initiator is a water-soluble peroxy compound.

11. Process according to claim 1, wherein the surface-active agent is a partial stearyl-ester of the condensation product of isomerized soya bean oil and maleic anhydride.

12. A process according to claim 1 wherein the surface-active agent is a triglyceride of glycerol and monocarboxylic acids containing 5–30 carbon atoms, at least one of the acids radicals of said acids containing a cyclic group formed by the addition of a dienophile substance selected from the group consisting of unsaturated monocarboxylic acids, unsaturated dicarboxylic acids and their anhydrides and esters, to conjugated double bonds in a fatty acid radical, and the initiator is a water-soluble peroxy compound and the monomer is vinyl chloride.

13. A process according to claim 12 wherein the surface-active agent is a partial stearyl-ester of the condensation product of isomerized soya bean oil and maleic anhydride.

14. A process according to claim 12 wherein the surface-active agent is triglyceride consisting of an adduct of isomerized soybean oil and a maleic acid half ester.

15. A process according to claim 12 wherein the surface-active agent is a triglyceride consisting of an adduct of isomerized soybean oil and sorbic acid.

16. A process according to claim 12 wherein the surface-active agent is a triglyceride consisting of an ester of castor oil and maleic acid.

17. A process according to claim 12 wherein the surface-active agent is a triglyceride derived from castor oil by interesterification with an oil until the resultant oil predominantly consists of molecules containing one hydroxy fatty acid radical, and esterification of the hydroxy group with maleic acid.

References Cited by the Examiner
UNITED STATES PATENTS

| | | | |
|---|---|---|---|
| 2,562,191 | 7/1951 | Howerton | 260—92.8 |
| 2,580,277 | 12/1951 | Boyd et al. | 260—92.8 |
| 2,934,529 | 4/1960 | Van Dij et al. | 260—89.5 |
| 3,015,566 | 1/1962 | Becker et al. | 99—123 |

JOSEPH L. SCHOFER, *Primary Examiner.*

PHILIP E. MANGAN, *Examiner.*

H. WONG, *Assistant Examiner.*

UNITED STATES PATENT OFFICE
CERTIFICATE OF CORRECTION

Patent No. 3,288,772                          November 29, 1966

Ewald Georg Becker et al.

It is hereby certified that error appears in the above numbered patent requiring correction and that the said Letters Patent should read as corrected below.

Column 1, line 51, for "molecule" read -- molecular --; column 2, line 36, for "tataric" read -- tartaric --; column 4, line 34, for "contaning" read -- containing --; column 4, lines 69 to 75, for the right-hand portion of the formula reading "CO.O.CO.R" read -- $CO.O.CH_2$ --; column 5, line 4, for "obtainted" read -- obtained --; lines 23 to 26, for the upper left-hand portion of the formula reading $CH_2.O.CO.R^7.CO.R$      read      $CH_2O.CO.R^7.CO.O.R$ lines 23 to 26, for the middle right-hand portion of the formula reading $CH.O.CO^9.CO.OH$      read      $CH.O.CO.R^9.CO.OH$ column 7, line 11, for "hydroxycarboxylic" read -- dicarboxylic --; lines 11 to 12, for "dicarboxyl-mono-carboxylic" read -- mono-hydroxy-mono-carboxylic --; column 10, line 12, for "acids", first occurrence, read -- acid --.

Signed and sealed this 19th day of September 1967.

(SEAL)
Attest:

ERNEST W. SWIDER                          EDWARD J. BRENNER
Attesting Officer                        Commissioner of Patents